(12) United States Patent
Mouton

(10) Patent No.: US 8,312,681 B2
(45) Date of Patent: Nov. 20, 2012

(54) LEAKTIGHT FRAME FOR A WINDOW AND A MECHANICAL ASSEMBLY PROVIDED WITH SUCH A FRAME

(75) Inventor: Luc Mouton, Eguilles (FR)

(73) Assignee: EUROCOPTER, Marignane Cedex (FR)

( * ) Notice: Subject to any disclaimer, the term of this patent is extended or adjusted under 35 U.S.C. 154(b) by 380 days.

(21) Appl. No.: 12/547,900

(22) Filed: Aug. 26, 2009

(65) Prior Publication Data

US 2010/0051747 A1    Mar. 4, 2010

(30) Foreign Application Priority Data

Aug. 27, 2008 (FR) ...................... 08 04723

(51) Int. Cl.
*E06B 3/00* (2006.01)
(52) U.S. Cl. .......................... 52/208; 52/464
(58) Field of Classification Search ............ 52/461, 52/465, 466, 208; 49/475.1; 244/129.3
See application file for complete search history.

(56) References Cited

U.S. PATENT DOCUMENTS

| | | | |
|---|---|---|---|
| 3,303,626 A | 2/1967 | Brigham | |
| 4,266,383 A * | 5/1981 | Krueger et al. | 52/204.597 |
| 5,460,660 A * | 10/1995 | Albright et al. | 136/251 |
| 5,678,383 A * | 10/1997 | Danielewicz | 52/775 |
| 5,826,824 A * | 10/1998 | Martin et al. | 244/129.3 |
| 6,027,073 A | 2/2000 | Ferrier | |
| 7,257,927 B2 * | 8/2007 | Sayer | 52/171.1 |
| 2004/0128924 A1 * | 7/2004 | Kobrehel et al. | 52/203 |

FOREIGN PATENT DOCUMENTS

| | | |
|---|---|---|
| DE | 916 501 | 8/1954 |
| DE | 195 18 658 | 11/1996 |
| EP | 0 175 981 | 4/1986 |
| EP | 0 249 560 | 12/1987 |
| FR | 1 388 582 | 2/1965 |
| FR | 2 548 256 | 1/1985 |
| FR | 2 766 156 | 1/1999 |
| FR | 2 858 950 | 2/2005 |

OTHER PUBLICATIONS

French Search Report dated Apr. 7, 2009, from corresponding French application.

* cited by examiner

*Primary Examiner* — Jeanette E. Chapman
*Assistant Examiner* — Daniel Kenny
(74) *Attorney, Agent, or Firm* — Brooks Kushman P.C.

(57) ABSTRACT

A leaktight frame (10) for a window (3) suitable for securing the window (3) to a carrier structure (2), has first and second sealing gaskets (11, 12) respectively suitable for being arranged on a first periphery (3') of the window (3) and on a second periphery (2') of the carrier structure (2), the frame (10) being provided with releasable holder elements (20) for clamping the first and second gaskets (11, 12) onto the window (3) and the carrier structure (2).

16 Claims, 2 Drawing Sheets

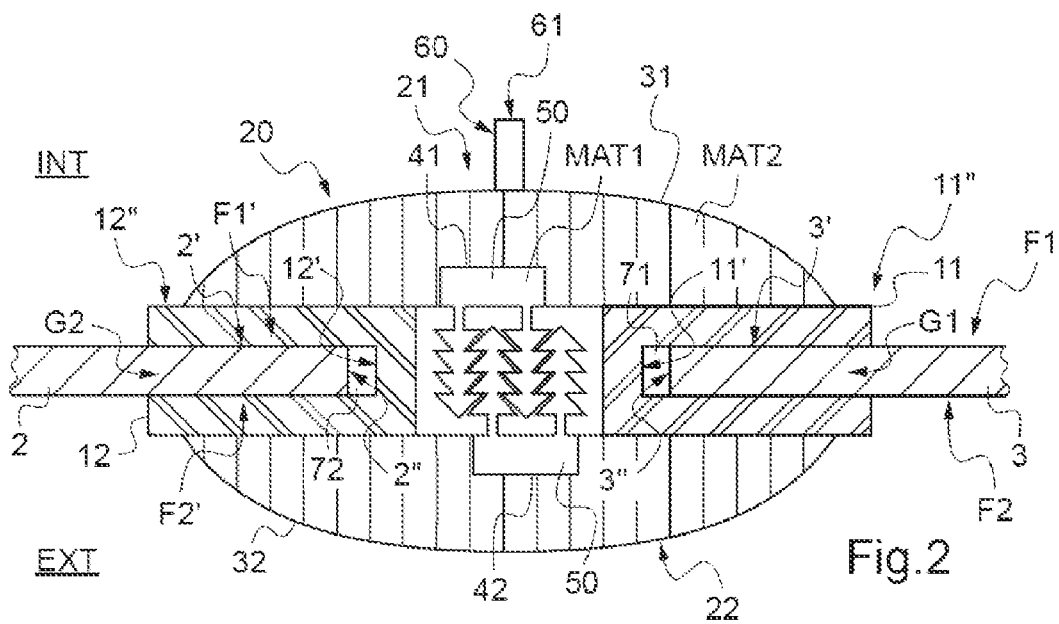
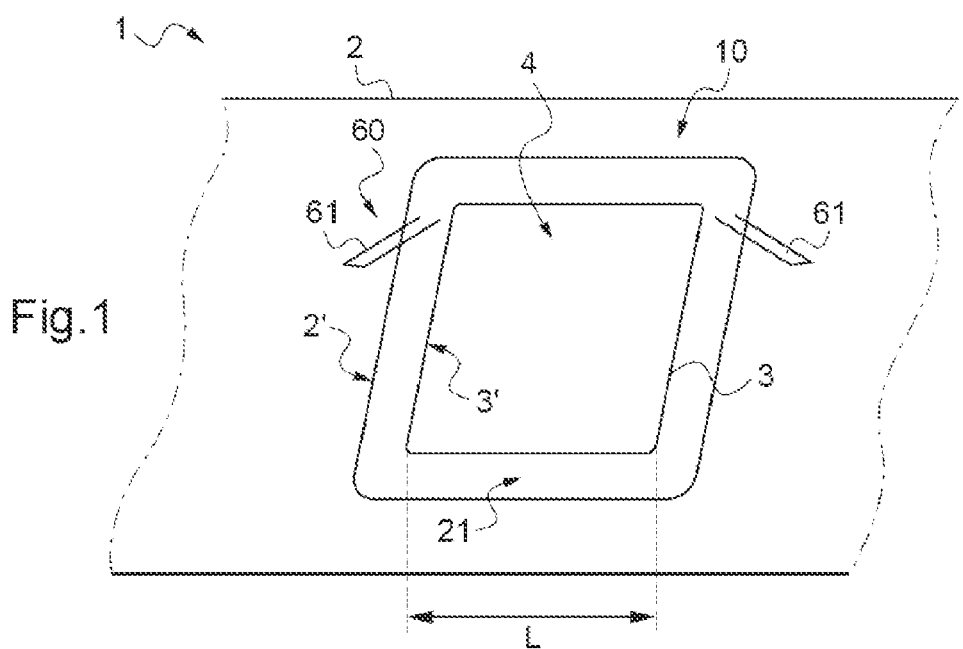
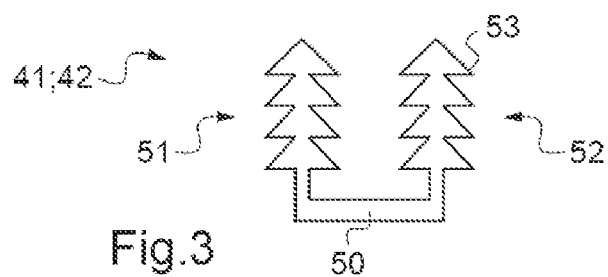

LEAKTIGHT FRAME FOR A WINDOW AND A MECHANICAL ASSEMBLY PROVIDED WITH SUCH A FRAME

FIELD OF THE INVENTION

The present invention relates both to a leaktight frame for a window suitable for securing the window to a carrier structure, and also to a mechanical structure provided with such a frame.

More particularly, the invention relates to the frame for an aircraft window that is large, i.e. a pane having a dimension in length or in width that is greater than 0.8 meters (m), in particular.

BACKGROUND OF THE INVENTION

Document EP 0 175 981 proposes a frame for fastening a window in an opening in a motor vehicle.

According to that document, the frame includes a receiver groove for receiving the pane, and an adapter element for fastening to the opening in the motor vehicle.

Thus, the frame and the adapter element constitute a gasket enabling the pane to be secured to the motor vehicle.

Nevertheless, it should be observed that the technical field of aircraft windows is remote from the technical field of motor vehicle windows. The frame of an aircraft window firstly needs to be capable of withstanding high levels of thermal expansion, and secondly needs to be sufficiently stiff to hold the window in position in the frame in spite of the aerodynamic forces to which it is subjected, and while nevertheless being leaktight.

The gasket described in document EP 0 175 981 appears to be difficult to make compatible with use in aviation.

A priori, the same applies to the device described in document FR 2 548 256, which device is provided with two elements, namely a molding and a glazing bead that co-operate to form two grooves.

Thus, the two lips of the molding define one groove while one lip of the molding co-operates with one lip of the glazing bead to form a second groove.

Document DE 916501 presents a single gasket provided with first and second extreme zones connected together by an intermediate zone.

That gasket seems difficult to implement on an aircraft, in particular given aerodynamic stresses.

Document EP 0 249 560 describes a channel-section member that is fitted onto the edge face of a pane and that co-operates with a closure section member.

Document FR 2 858 950 relates to a sealing module for a fixed pane, i.e. a pane that a priori is not suitable for being removed.

Similarly, documents DE 19 518 158 and FR 1 388 582 describe devices for car applications.

Furthermore, aircraft windows of large size need to be suitable for jettisoning so as to allow passengers to escape from the aircraft after an incident. It should be observed that, unfortunately, this function is not provided by document EP 0 175 981, and more generally for motor vehicles.

Jettisoning windows of large size then releases openings in the fuselage of an aircraft, where such openings are particularly useful if conventional access to the aircraft is blocked.

Document FR 2 766 156 discloses a frame for a window that can be jettisoned.

That frame includes a gasket having a core from which there extend both an outer edge and an inner edge, the outer edge being secured to a window carrier structure while the inner edge covers the periphery of the window.

In addition, the frame is provided with means for cutting the core of the gasket to separate said outer and inner edges, and thus to separate the window from the carrier structure.

Although effective, that device would appear to be restricted to windows of large size.

The greater the size of a window, the more the gasket needs to be able to accommodate a large amount of clearance between the window and the carrier structure in order to cope with differential expansion between the carrier structure and the window. In addition, the gasket needs to withstand a pressure difference between the outside and the inside of the aircraft.

Under such circumstances, the gasket needs to be enlarged in exaggerated manner, to the detriment of its weight and its visual appearance.

Furthermore, the gasket made according to document FR 2 766 156 is dedicated to a given type of window. Consequently, each window requires a specific gasket to be fabricated, thus having the consequence of leading to fabrication costs that are relatively large.

Finally, once the core of the gasket has been cut through, the frame cannot be reused.

OBJECT AND SUMMARY OF THE INVENTION

An object of the present invention is thus to provide a leaktight frame for securing a window of large size to a carrier structure of an aircraft, the frame having acceptable dimensions and being suitable for adapting to multiple windows at moderate cost.

According to the invention, a leaktight frame for a window suitable for securing the window to a carrier structure, in particular a window and a carrier structure of an aircraft, is remarkable in that the frame has first and second distinct sealing gaskets suitable respectively for being arranged on a first periphery of the window and on a second periphery of the carrier structure, the frame also being provided with removable and rigid holder means for clamping the first and second gaskets together with the window and the carrier structure. The holder means then hold the first periphery in the first gasket and the second periphery in the second gasket.

Consequently, the first gasket is arranged on the first periphery of the window and then the second gasket is arranged on the second periphery of the carrier structure.

The first and second gaskets may be obtained from an original gasket that is fabricated in linear form at moderate cost and then cut to size appropriately.

Thereafter, the window is secured to the carrier structure with the help of the removable holder means. Since the window is held in place by holder means that are dedicated to this purpose, it is no longer necessary to make use of a single gasket of excessive size.

As a result, and unlike prior art solutions, the invention makes use of three distinct elements, each adapted to a specific function, instead of a single gasket that needs to provide a leakproofing function and a function of transferring aerodynamic loads.

The first gasket, the second gasket, and the holder means serve respectively to provide sealing around the window, sealing around the carrier structure, and to transfer loads.

In addition, since these functions are separated, it is easy to establish clearance between the first gasket and the window and/or between the second gasket and the carrier structure so as to anticipate and accommodate thermal expansion of the window and/or the carrier structure.

Finally, since the holder means are removable, it is possible to separate the window so as to jettison it and thus allow passengers to escape from an aircraft through the carrier structure, for example.

Furthermore, the invention includes one or more of the following additional characteristics.

For example, the first and second gaskets are not only distinct, but they are also independent from each other, these first and second gaskets not co-operating with each other to perform their function, unlike document FR 2 548 256, in particular.

Advantageously, the holder means comprise first and second clamping means that co-operate mutually in reversible manner to clamp firstly the first gasket to the window, and secondly the second gasket to the carrier structure.

For example, in a first stage, the first periphery of the window is surrounded by the first gasket and the second periphery of the carrier structure is surrounded by the second gasket.

Thereafter, during a second stage, the first clamping means are engaged in the second clamping means so as to press firstly the first gasket against the window and secondly the second gasket against the carrier structure.

The first and second clamping means are then placed on either side of the subassembly comprising the carrier structure together with the window, and they hold the window in position within an opening in the carrier structure. Consequently, if the carrier structure is an aircraft, the first clamping means are located for example on the inside of the aircraft while the second clamping means are arranged on the outside of the aircraft.

The free ends of the first gasket and of the second gasket advantageously project beyond the holder means in order to guarantee good leakproofing.

In addition, in order to optimize fabrication costs, the first and second clamping means may be paired. They can then be used equally well inside or outside the aircraft. The first and second clamping means are then arranged respectively inside and outside the aircraft or outside and inside the aircraft.

Similarly, if each of the clamping means is provided with a rigid web and with associated fastener means, i.e. a first web and first fastener means for the first clamping means and a second web and second fastener means for the second clamping means, then the first fastener means co-operate with the second fastener means to clamp firstly the first gasket to the window and secondly the second gasket to the carrier structure.

Each fastener means is then optionally inserted in the associated web, the first fastener means being inserted in the first web and the second fastener means being inserted in the second web.

In a first configuration, the fastener means and the associated web comprise respectively first and second different materials, thus making it possible to adjust their respective stiffnesses to their functions.

This characteristic makes it possible to obtain firstly a web that is sufficiently rigid to adapt to the window and the carrier structure, and secondly fastener means that are sufficiently strong to withstand the forces to which the window is subjected.

Each web is then stiff in bending so as to enable the forces to which the window is subjected to be transferred to the surrounding structure, e.g. the forces due to the pressure exerted on the window. For its part, the associated fastening zone is rigid in shear so as to make the assembly safe.

In contrast, in a second configuration, each clamping means comprises a single piece, the fastener means and the associated web of a clamping means being obtained from a single molding and thus using the same material.

Nevertheless, in order to optimize mechanical characteristics, and in particular stiffness, of the fastener means and of the associated web to their respective functions, it is possible to add long fibers in specific locations.

Thus, long fibers, having a length of about three centimeters, are placed in the web along the width of the web in a direction substantially parallel to the carrier structure in order to optimize the stiffness in bending of the web. As a result, the web is capable of transferring forces from the window to the carrier structure.

Long fibers are then placed in the mold in the appropriate locations at the time of molding.

It should be observed that it is also possible to insert short fibers locally as a function of needs.

Furthermore, each fastener means has a U-shaped section so as to present a base and two side branches, the base of the fastener means being secured to the associated web, for example. In a first configuration, said base is adhesively bonded to the web, for example, while in a second configuration said base is intimately associated with the web during molding of the clamping means.

Furthermore, in order to enable the first and second clamping means to co-operate with each other, the branches of the fastener means are optionally provided with retaining means, the first retaining means of the first fastener means co-operating with the second retaining means of the second fastener means to secure the first clamping means to the second clamping means in reversible manner.

Each fastener means defines a retaining groove between its branches, with one branch of one of the fastener means being engaged in the retaining groove of the other fastener means.

Because of the presence of the retaining means, e.g. a plurality of catches, it becomes practically impossible to separate the first and second fastener means, and consequently the first and second clamping means, without external intervention.

Thus, the first and second fastener means guarantee that the window is secured to the carrier structure whatever the pressure exerted by ambient air on the window.

Furthermore, the first and second gaskets, made from a material forming part of the elastomer group, are advantageously of channel-section so as define respective receiver grooves, a first receiver groove of the first gasket receiving a first periphery of said window and a second receiver groove of the second gasket receiving a second periphery of the carrier structure.

Thus, the first and second gaskets surround the respective first and second peripheries of the window and of the carrier structure.

Advantageously, in order to anticipate thermal expansion of the window, the first periphery of the window penetrates part way only into the first receiver groove of the first gasket, and does not fill said first receiver groove completely. Similarly, in order to anticipate thermal expansion of the carrier structure, the second periphery of said carrier structure penetrates part way only into the second receiver groove of the second gasket and does not occupy said second receiver groove completely.

In addition, in order to enable the window to be jettisoned, the frame may include disconnection means for disconnecting the holder means, suitable for separating the first clamping means from the second clamping means, for example.

With the holder means comprising first and second clamping means, the disconnection means may be provided with at least one traction means, such as a strap, a handle, or a ring, arranged on the first and/or the second clamping means.

For example, the first clamping means may be provided with a strap and the second clamping means with a ring.

Where necessary, in order to encourage separation, the traction means are connected to a zone of weakness of the first and/or second clamping means associated therewith.

This zone of weakness makes it easier to remove the window reversibly. Since the zone of weakness is not a breakable zone, removing the window is not destructive.

It then becomes possible to perform evacuation exercises without damaging the frame. The frame thus becomes reusable.

The present invention also provides a mechanical assembly fitted with a leaktight frame of the invention. Thus, said mechanical assembly is provided with a window and with a carrier structure suitable for receiving the window therein, said mechanical assembly including said leaktight frame between a first periphery of the window and a second periphery of the carrier structure.

Under such circumstances, the window may be of large size, having a dimension greater than 0.8 m.

In addition, and as mentioned above, it is advantageous for the first and second gaskets to project from the holder means.

In addition, the first gasket is of channel-section defining a first receiver groove, with the first periphery of the window penetrating part of the way into the first receiver groove of the first gasket.

Similarly, the second gasket has a channel-section defining a second receiver groove, the second periphery of the carrier structure penetrating part of the way into the second receiver groove of the second gasket.

BRIEF DESCRIPTION OF THE DRAWINGS

The invention and its advantages appear in greater detail from the following description of embodiments given by way of illustration with reference to the accompanying drawings, in which:

FIG. 1 is a side view of an aircraft fuselage;

FIG. 2 is a section through a frame of the invention;

FIG. 3 is a section through fastener means;

MORE DETAILED DESCRIPTION

Figure 4:
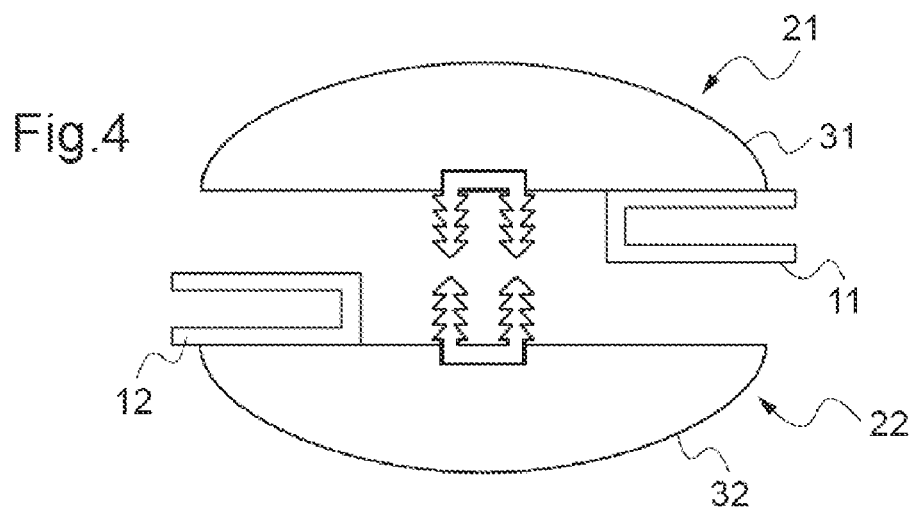
FIG. 4 is a section through a first variant of the invention.

Any element present in more than one figure is given the same reference in each of them.

FIG. 1 shows a mechanical assembly 1 of the fuselage of an aircraft, e.g. a rotorcraft.

The mechanical assembly 1 includes a carrier structure 2 in which an opening 4 is provided.

A window 3, i.e. a pane of length L greater than or equal to 0.8 m, is then arranged within the carrier structure 2, more particularly in its opening 4.

As a result, the mechanical assembly is fitted with a frame 10 for securing the window 3 in leaktight manner to the carrier structure 2.

More precisely, the frame 10 connects a first periphery 3' of the window mechanically and in leaktight manner with a second periphery 2' of the carrier structure 2, the first and second peripheries 3' and 2' facing each other when the window 3 is placed in the opening 4 of the carrier structure 2.

With reference to FIG. 2, the frame 10 includes first and second distinct sealing gaskets 11 and 12.

The first gasket 11, e.g. made of elastomer, is of channel-section by having a U-shaped form and defines a first receiver groove G1.

This first gasket 11 may come from an original gasket produced in linear form and then cut to the appropriate size.

The first gasket 11 is then arranged on the first periphery 3' of the window so as to cover the inside and outside faces F1 and F2 of the window 3 in the vicinity of said first periphery 3'. Consequently, the first periphery 3' is engaged in the first receiver groove G1 of the first gasket 11.

It should be observed that the first periphery 3' occupies the first receiver groove in part only and thus does not reach the first end wall 11' of said first receiver groove G1.

As a result, the first edge face 3" of the window is spaced apart from the first end wall 11' of the first receiver groove G1, and thus from the first gasket 11, by first clearance 71. The first clearance 71 allows the window 3 to expand thermally.

Similarly, the second gasket 12, made of elastomer and coming from an original gasket produced in linear form and then cut to the appropriate size, for example, is of channel-section by having a U-shaped form and defines a second receiver groove G2.

The second gasket 12 is then arranged on the inside and outside faces F1' and F2' of the second periphery 2' of the carrier structure 2. Consequently, the second periphery 2' is engaged in the second receiver groove G2 of the second gasket 12.

The second periphery 2' thus occupies the second receiver groove G2 in part only and does not reach the second end wall 12' thereof. Thus, the second edge face 2" of the carrier structure 2 is spaced apart from the second end wall 12' of the second receiver groove G2, and thus from the second gasket 12, by second clearance 72 that enables said carrier structure to expand thermally.

Furthermore, the frame 10 possesses removable holder means 20 that are sufficiently stiff to hold the first and second gaskets 11 and 12 in position and secure the window 3 to the carrier structure 2. The holder means 20 match the shape of the window 3 and the carrier structure 2.

Thus, forces applied to the window 3 are transmitted to the carrier structure 2 via the holder means 20.

Consequently, the holder means 20 clamp the first gasket 11 to the window 3 and the second gasket 12 to the carrier structure 2.

In FIG. 2 it can be seen that when the holder means 20 press the first and second gaskets 11 and 12 respectively against the window 3 and the carrier structure 2, these first and second gaskets 11 and 12 project from the holder means 20. More precisely, the free ends 11" and 12" project from the holder means 20.

Advantageously, the holder means 20 are provided with first and second clamping means 21 and 22 arranged on either side of the subassembly comprising the carrier structure, the window, and the first and second gaskets, with each of the first and second clamping means 21 and 22 being placed against both the first and the second gaskets 11 and 12.

Thus, the first clamping means 21 are arranged against the first and second gaskets 11 and 12 on the inside INT of the aircraft, while the second clamping means 22 are arranged against the first and second gaskets 11 and 12 on the outside EXT of the aircraft.

The first and second clamping means then co-operate with each other, being secured to each other reversibly so as to clamp the first gasket 11 to the window 3 and the second gasket 12 to the carrier structure 2.

Consequently, each clamping means comprises a rigid web and fastener means, namely a first web 31 and first fastener means 41 for the first clamping means 21 and a second web 32 and second fastener means 42 for the second clamping means 22.

To hold the window 3 in the opening 4 of the carrier structure, the first fastener means 41 co-operate with the second fastener means 42 so that each of the first and second webs 31 and 32 is pressed against both of the first and second gaskets 11 and 12.

With reference to FIG. 3, each fastener means 41 has a U-shaped section so as to present two side branches 51 and 52 interconnected by a base 50.

In addition, each side branch 51 and 52 possesses retaining means 53, e.g. fastener catches.

In a first configuration, as shown in FIG. 2, the base 50 of the first fastener means 41 is optionally fastened to the first web 31 by conventional means, e.g. by adhesive.

It should be observed that it is advantageous to make the first fastener means 41 and the first web 31 from materials that are different, respectively a first material MAT1 and a second material MAT2.

It is then possible to select the materials while taking into consideration the functions of the elements of the first clamping means. More precisely, a second material may be used that is a plastics material reinforced with long fibers, for example, so as to be stiffer in bending than the first material.

Similarly, the base 50 of the second fastener means 42 is fastened to the second web 32 by conventional means, e.g. by adhesive.

Furthermore, the second fastener means 42 and the second web 32 are advantageously made out of respective different first and second materials MAT1 and MAT2, with the second material being stiffer in bending than the first material.

Figure 6:
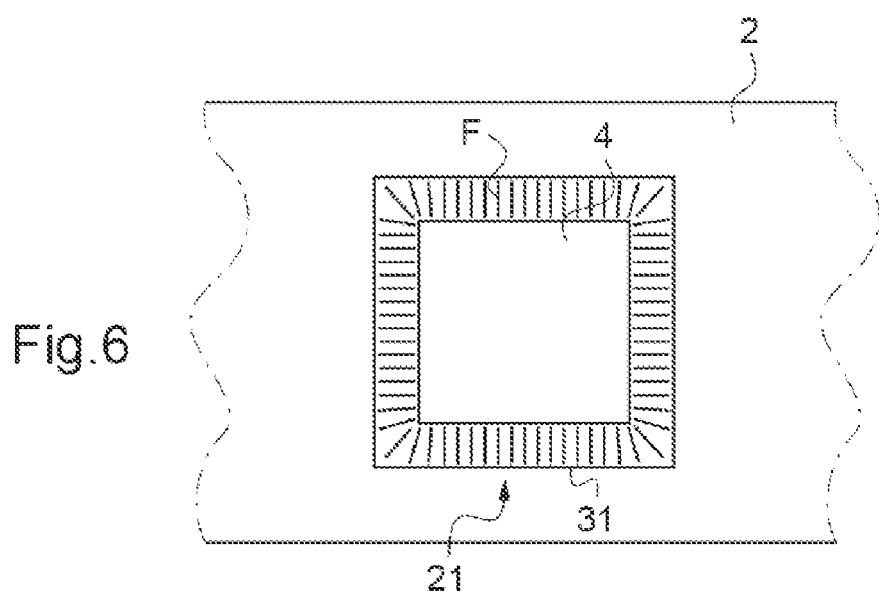
FIG. 6 is a view showing one-piece clamping means.

In the second configuration, shown in FIG. 6, each clamping means comprises a single piece. Each clamping means is then produced by a single mold in which long fibers F are inserted locally in an orientation suitable for giving the required mechanical characteristics to the web. Conversely, short fibers may be placed in the mold for optimizing the characteristics of the fastener means.

As a result, each long fiber F extends substantially parallel to the carrier structure while being directed across the width of the web, with the length of the web being its greatest dimension, while its thickness is its smallest dimension.

For a window of circular shape, the fibers F would thus be arranged in a radial direction of the web.

With reference to FIG. 2, to enable the first and second clamping means 21 and 31 to be secured to each other in reversible manner, the retaining means of the first fastener means 41 co-operate with the retaining means of the second fastener means 42.

For this purpose, one branch of the second fastener means 42 is arranged between the two branches of the first fastener means 41, and one branch of the first fastener means 41 is arranged between the two branches of the second fastener means 42.

The catches of the retaining means then prevent the first and second clamping means from separating in unwanted manner.

It should be observed that the first and second clamping means 21 and 22 are advantageously paired.

Optionally, in order to be able to co-operate with each other, it is appropriate to offset them. As a result, with reference to FIG. 2 and in the plane of the sheet containing the figure, the second clamping means 22 are not exactly in register with the first clamping means 21.

Furthermore, the frame 10 is advantageously removable to allow the passengers to escape from the aircraft, or to allow rescuers to penetrate therein, through the opening 4, should that be necessary. The window may thus also serve as an emergency exit.

It is therefore appropriate to be able to remove the holder means and thus to separate the first clamping means 21 from the second clamping means 22 by exerting a traction force on the first clamping means 21 and/or on the second clamping means 22.

Consequently, in order to exert such a traction force easily, the holder means 20 includes disconnection means 60.

The disconnection means 60 are then provided with at least one traction means 61, e.g. a strap, that is fastened to the clamping means 21 and 22 on the inside INT and/or the outside ENT of the aircraft.

With reference to FIG. 1, the traction means comprise two straps secured to the first clamping means 21.

By taking hold of the traction means, a passenger can separate the first clamping means 21 from the second clamping means 22. The window 3 is then no longer held and can be removed.

It should be observed that the frame may provide conventional means, e.g. a removable cover, for protecting the traction means against any untimely action.

In order to facilitate disconnection, the traction means are optionally connected to a zone of weakness of the holder means presenting weakened retaining characteristics between the first and second clamping means. Thus, the fastener means of the clamping means may omit retaining means 53 in this zone of weakness, for example.

Removal of the window is then not destructive, which means that the frame 10 can be reusable.

It should be observed that if the frame is not provided with disconnection means, one of the holder means 53 is secured to a gasket.

For example, in the first variant shown in FIG. 4, the first clamping means 21 are secured to the first gasket 11, this first gasket 11 being adhesively bonded to the first web 31. Similarly, the second clamping means 22 are secured to the second gasket 12, the second gasket 12 being adhesively bonded to the second web 32.

Figure 5:
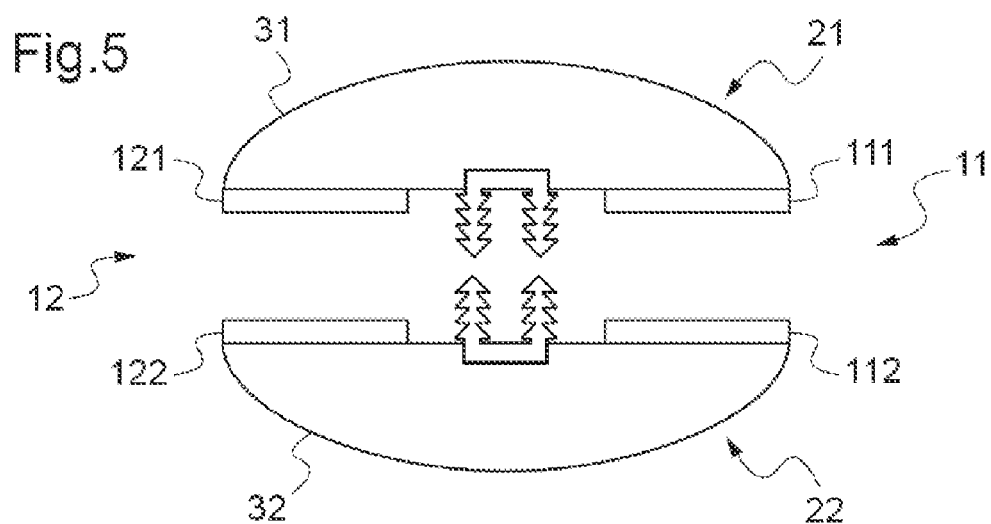
FIG. 5 is a section through a second variant of the invention.

In the second variant shown in FIG. 5, the first and second gaskets 11 and 12 may each comprise a respective inner gasket 111, 121 and a respective outer gasket 112, 122, which gaskets are secured, optionally by adhesive bonding, to the first and second clamping means 21 and 22.

Thus, a first inner gasket 111 of the first gasket 11 and a second inner gasket 121 of the second gasket 12 are fastened to the first web 31 of the first clamping means 21. Similarly, a first outer gasket 112 of the first gasket 11 and a second outer gasket 122 of the second gasket 12 are fastened to the second web 32 of the second clamping means 22.

Nevertheless, the first and second gaskets and the holder means continue to form three different members, even if those members may be connected together.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A leaktight frame for a window and suitable for securing said window to a carrier structure, wherein the frame includes removable distinct first and second U-shaped sealing gaskets with leaktight channel sections having continuous inner surfaces orthogonal to their length respectively suitable for being arranged on a first periphery of said window and on a second periphery of said carrier structure, said frame being provided with removable holder means distinct from the first and second gaskets for clamping said first and second gaskets onto the window and the carrier structure, the holder means holding the first periphery in the first gasket and the second periphery in the second gasket;

wherein said first and second U-shaped gaskets each define a receiver groove, a first receiver groove of the first gasket receiving a first periphery of said window and a second receiver groove of the second gasket receiving a second periphery of said carrier structure.

2. A frame according to claim 1, wherein said holder means comprise first and second clamping means that co-operate mutually in reversible manner to clamp firstly said first gasket to said window, and secondly said second gasket to said carrier structure.

3. A frame according to claim 2, wherein said first and second clamping means are paired.

4. A frame according to claim 2, wherein each clamping means is provided with a rigid web and with associated fastener means, including a first web and first fastener means for the first clamping means, and a second web and second fastener means for the second clamping means, said first fastener means cooperating with said second fastener means so that the holder means clamp firstly said first gasket to said window and secondly said second gasket to said carrier structure.

5. A frame according to claim 4, wherein each of the clamping means comprises a single piece.

6. A frame according to claim 4, wherein each of the fastener means is secured in said associated web.

7. A frame according to claim 4, wherein the fastener means and the associated web comprise respectively first and second materials (MAT1, MAT2) that are different.

8. A frame according to claim 4, wherein each of the fastener means has a U-shaped section so as to present a base and two side branches, said base of the fastener means being secured to the associated web.

9. A frame according to claim 8, wherein said branches are provided with retaining means, the first retaining means of the first fastener means co-operating with the second retaining means of the second fastener means to secure the first clamping means reversibly to the second clamping means.

10. A frame according to claim 1, including disconnection means attached to the removable holder means for disconnecting the holder means.

11. A frame according to claim 10, wherein said holder means include first and second clamping means, said disconnection means being provided with at least one traction means arranged on said first and/or second clamping means.

12. A frame according to claim 11, wherein said traction means are connected to a zone of weakness of said first and/or second clamping means.

13. A mechanical assembly provided with a window and a carrier structure suitable for receiving said window, said mechanical assembly comprising a leaktight frame between a first periphery of said window and a second periphery of the carrier structure, wherein said frame includes removable distinct first and second U-shaped sealing gaskets with leaktight channel sections having continuous inner surfaces orthogonal to their length respectively suitable for being arranged on a first periphery of said window and on a second periphery of said carrier structure, said frame being provided with removable holder means distinct from the first and second gaskets for clamping said first and second gaskets onto the window and the carrier structure, the holder means holding the first periphery in the first gasket and the second periphery in the second gasket, wherein said first gasket has a channel-section defining a first receiver groove, the first periphery of the window penetrating part of the way into the first receiver groove of the first gasket.

14. A mechanical assembly according to claim 13, wherein said first and second gaskets project from the holder means.

15. A mechanical assembly according to claim 13, wherein said second gasket has a channel-section defining a second receiver groove, the second periphery of the carrier structure penetrating part of the way into the second receiver groove of the second gasket.

16. A leaktight frame for a window that secures the window to a carrier structure, wherein the frame includes first and second sealing gaskets with leaktight channel sections having continuous inner surfaces orthogonal to their length respectively arranged on a first periphery of said window and on a second periphery of said carrier structure, removable holder means distinct from the first and second sealing gaskets for clamping said first and second gaskets onto the window and the carrier structure, the removable holder means holding the first periphery in the first gasket and the second periphery in the second gasket, thereby creating a leaktight seal between the window and the carrier structure, wherein said first and second gaskets have a channel-section defining a receiver groove, a first receiver groove of the first gasket receiving a first periphery of said window and a second receiver groove of the second gasket receiving a second periphery of said carrier structure.

* * * * *